United States Patent

Ozulkulu et al.

[11] Patent Number: 5,913,161
[45] Date of Patent: Jun. 15, 1999

[54] APPARATUS AND METHODS FOR THE LAWFUL INTERCEPT OF CELLULAR COMMUNICATIONS

[75] Inventors: Esref Ozulkulu, Monroe; Ahmet Ozalp, Stratford; Curtis Hartmann, Branford, all of Conn.

[73] Assignee: ADC Telecommunications, Inc., Minnetonka, Minn.

[21] Appl. No.: 08/629,773

[22] Filed: Apr. 9, 1996

[51] Int. Cl.$^6$ .................................................. H04Q 7/34
[52] U.S. Cl. ........................... 455/405; 455/424; 455/423
[58] Field of Search .................................. 455/405, 410, 455/412, 424, 423

[56] References Cited

U.S. PATENT DOCUMENTS

| | | | |
|---|---|---|---|
| 5,428,667 | 6/1995 | Easterling et al. | 455/410 |
| 5,471,519 | 11/1995 | Howe et al. | 379/67 |
| 5,511,111 | 4/1996 | Serbetcioglu et al. | 455/413 |
| 5,590,171 | 12/1996 | Howe et al. | 379/34 |

*Primary Examiner*—Dwayne D. Bost
*Assistant Examiner*—Myron K. Wyche
*Attorney, Agent, or Firm*—Schwegman, Lundberg, Woessner & Kluth, P.A.

[57] ABSTRACT

Apparatus and methods for the lawful intercept of mobile telecommunication are provided. The A Interface at a base station subsystem is bridged with a Y-cable, and a copy of the data on the telecommunications lines are forwarded to a switch. The out-of-band control information such as SS7 signalling information is forwarded to a processor which continuously monitors the mobile identification numbers and/or telephone numbers of called and calling parties and compares the numbers to a database of to-be-tapped numbers. Upon finding a match, the processor causes the switch to provide the copy of the channel on which the call is being carried to a listening device.

13 Claims, 2 Drawing Sheets

APPARATUS AND METHODS FOR THE LAWFUL INTERCEPT OF CELLULAR COMMUNICATIONS

BACKGROUND OF THE INVENTION

1. Field of the Invention

The present invention relates generally to cellular telecommunications. More particularly, the present invention relates to an apparatus and method for the lawful intercept (i.e., "wiretap") of cellular telecommunications data.

2. State of the Art

Lawful intercept of telecommunications between two parties has a long history. Indeed, various techniques for intercepting communications over a fixed wire have been utilized for decades. However, as the field of telecommunications has changed, new techniques have been required for conducting lawful intercept. One new field of telecommunications which has seen explosive growth in the past few years is the field of mobile/cellular telecommunications. In cellular telecommunications, at least one of the parties to the call (which may be a conference call of more than two parties) has a wireless connection to base station system (BSS). Thus, the development of techniques for lawful intercept of cellular communications has been required.

One known technique for the "wiretap" of cellular communications involves the utilization of new equipment which can review the called and calling party telephone number information in proprietary call control logic during call processing, and access a database of telephone numbers in order to determine whether a wiretap is needed. If a determination is made that a wiretap is needed, a conference call is set up between all parties to the telephone call and a third "listening" party. With the conference call as arranged, the third listening party typically does not have the ability to send data to the conference. As will be appreciated by those skilled in the art, the third listening may be a "listening device" or a person.

A second known technique for the "wiretap" of mobile communications is similar to the first technique, except that adjunct equipment is used to upgrade existing equipment which does not have the wiretap capability. When a telephone call is received, the existing equipment compares the called and calling numbers to a database of numbers which are to be tapped, and if the call is to be tapped, the call is forwarded to the adjunct equipment. The adjunct equipment is then arranged to implement a conference call between the parties to the telephone call and third "listening" party.

It should be appreciated that the prior art techniques of wiretapping cellular communications provide useful capabilities. However, the prior art techniques also suffer from certain inadequacies. For example, the technique utilizing adjunct equipment suffers from the requirement that the adjunct equipment is being actively switched in and out. Should the adjunct equipment malfunction for any reason, all calls may be affected. On the other hand, the technique which utilizes proprietary call control logic suffers from the fact that the it cannot be easily implemented on existing equipment. Thus, in order to provide the wiretap functionality, in many situations, the existing equipment will have to be replaced at a great expense.

SUMMARY OF THE INVENTION

It is therefore an object of the invention to provide an apparatus for the legal intercept of mobile/cellular calls, where the apparatus is easily adapted to existing telecommunications apparatus.

It is another object of the invention to provide a method and apparatus for the legal intercept of mobile/cellular calls where an out-of-band signalling link which relates to all calls is continuously monitored.

It is a further object of the invention to provide a non-intrusive method and apparatus for the legal intercept of mobile/cellular calls.

It is an additional object of the invention to provide a method and apparatus for the legal intercept of mobile/cellular calls where the interface between a network switching system and a base station subsystem is continuously monitored.

Another object of the invention is to provide a method and apparatus which continuously monitor the SS7 control information provided by a base station subsystem in order to effect a legal intercept of a mobile/cellular call.

In accord with the objects of the invention, all telecommunications lines which might contain calls which are to be monitored are bridged at a base station subsystem in order to provide a copy of all data to a switch, and a copy of all out-of-band signalling channels on the telecommunications lines are continuously monitored by monitoring equipment coupled to the switch for control information regarding all calls being transported on the telecommunications lines. When a called or calling party number identification whose calls are to be legally intercepted is identified within the out-of-band channel by the monitoring equipment which has a database of such telephone number identifications, the monitoring equipment sets the switch to provide the copy of the channel on which the call is being carried to a listening device. When the lawfully intercepted call is completed as indicated by the out-of-band channel control information and determined by the monitoring equipment, the monitoring equipment resets the switch.

According to a preferred aspect of the invention, the out-of-band channel which is continuously monitored is an SS7 channel, and the telecommunications lines being bridged at the base station subsystem comprise the A Interface between the base station controller (BSC) and the mobile service switching center (MSC). For purposes herein, the "A-Interface" is to be understood broadly to constitute the interface between a network switching system element and a radio (base station) system element and is intended to be generic to both the GSM (Global System Mobile) communication standard, and North American standards such as IS54.

According to additional preferred aspects of the invention, Y-cables are used to bridge the A Interface being monitored such that any information passing in either direction over the A Interface is provided to the monitoring system. Where the A Interface includes, for example, E1 lines, the time slot (e.g., time slot 16) of the E1 lines carrying the SS7 control information is continuously monitored.

With the bridging cables, the switch, and the monitoring equipment which continuously monitors the out-of-band control (e.g., SS7) information, it should be appreciated that the provided call intercept apparatus advantageously provides a passive call intercept and can be used to easily upgrade existing equipment.

Additional objects and advantages of the invention will become apparent to those skilled in the art upon reference to the detailed description taken in conjunction with the provided figures.

DETAILED DESCRIPTION OF THE PREFERRED EMBODIMENT

Figure 1:
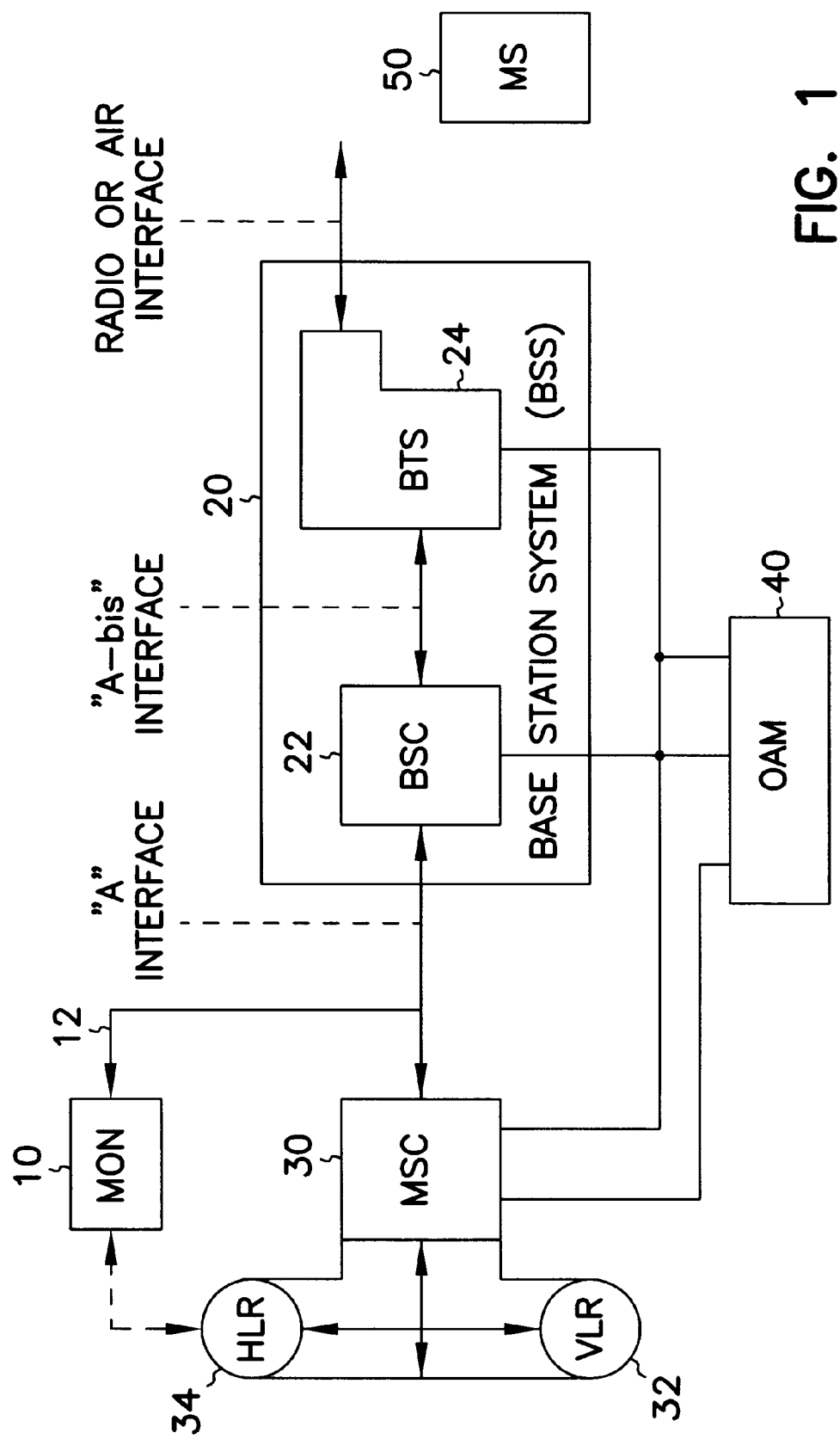
FIG. 1 is a high level block diagram showing the apparatus of the invention coupled to prior art GSM-standard system.

Turning to FIG. 1, the monitor (MON) 10 of the invention is seen coupled via Y-cables 12 to the A Interface of a prior art system which is compliant with the GSM standard. The prior art GSM system includes a base station system (BSS) 20 with a base station controller (BSC) 22 and base transceiver system (BTS) 24, a mobile service switching center (MSC) 30 with an associated visitor location register (VLR) 32 and home location register (HLR) 34, and a operation, administration, and management processor (OAM) 40 which is coupled to the BSC 22, BTS 24, and the MSC 30. The GSM system of FIG. 1 and its functioning are described in detail in Monby, Michel and Puntet, Marie-Bernadette, *The GSM System for Mobile Communication*, (Europe Media Duplication, S. A., France, 1992) (ISBN #2-907190-0-7), which is hereby incorporated by reference herein in its entirety. Briefly, when a mobile station (MS) 50 such as a cellular telephone is turned on, it sends out information (e.g., its mobile ID number) over the air interface. The information is picked up by a base transceiver station (BTS) 24 which forwards the information to a visitor location register (VLR) database 32. The VLR, which holds real time records of the cellular phones which are powered on in the system, may assign a "roaming" number for the cellular telephone.

If the user of the cellular phone 50 should wish to place a call, various information relating to the phone 50 (including its mobile identification number) and the call request is sent to the BTS 24 of the base station system 20 which communicates with the cellular telephone in the 900-Mhz frequency band. The BTS 24 and BSC 22 (between which exists an A-bis Interface) process the call and forward it to the MSC 30 over the A Interface. The A Interface utilizes the SS7 signalling standard and the GSM08.08 standard both of which are hereby incorporated by reference herein in their entireties. The MSC 30, in turn, sets up and switches the call as appropriate.

It should be appreciated that the MSC 30 acts as an interface for the base station to the public switched telephone network. It should also be appreciated that the mobile ID number and/or called or calling number of the called or calling party (as well as other data and signalling information) are sent across the A Interface.

In the other direction, should a call be placed to the mobile phone, the MSC 30 receives the call, checks the HLR 34 and VLR 32 as appropriate, and forwards the call to the base station system 20. In turn, the base station system 20 utilizes the BTS to transmit the call to the mobile phone 50. Should the mobile phone 50 leave the transmitting area of the particular base station system 20, the BSC 22 controls the hand-off of the call to another base station system (not shown) which is often coupled to the same MSC 30. It should be appreciated by those skilled in the art that in a typical GSM system, one BSC is used to handle multiple base transceiver stations (BSTs); and one MSC is used to handle multiple base station controllers (BSCs).

As previously mentioned, the monitoring system 10 of the invention is preferably coupled to the A Interface of the GSM system through the use of Y cables 12. Typically, in a GSM system, the physical connection between a BSS 20 and the MSC 30 is via one or more E1 cables. Thus, the Y cables 12 are preferably E1 Y-cables which copy all information crossing the A Interface to the monitoring system 10. Where T1 or other physical connections are used, appropriate Y cables are used.

Figure 2:
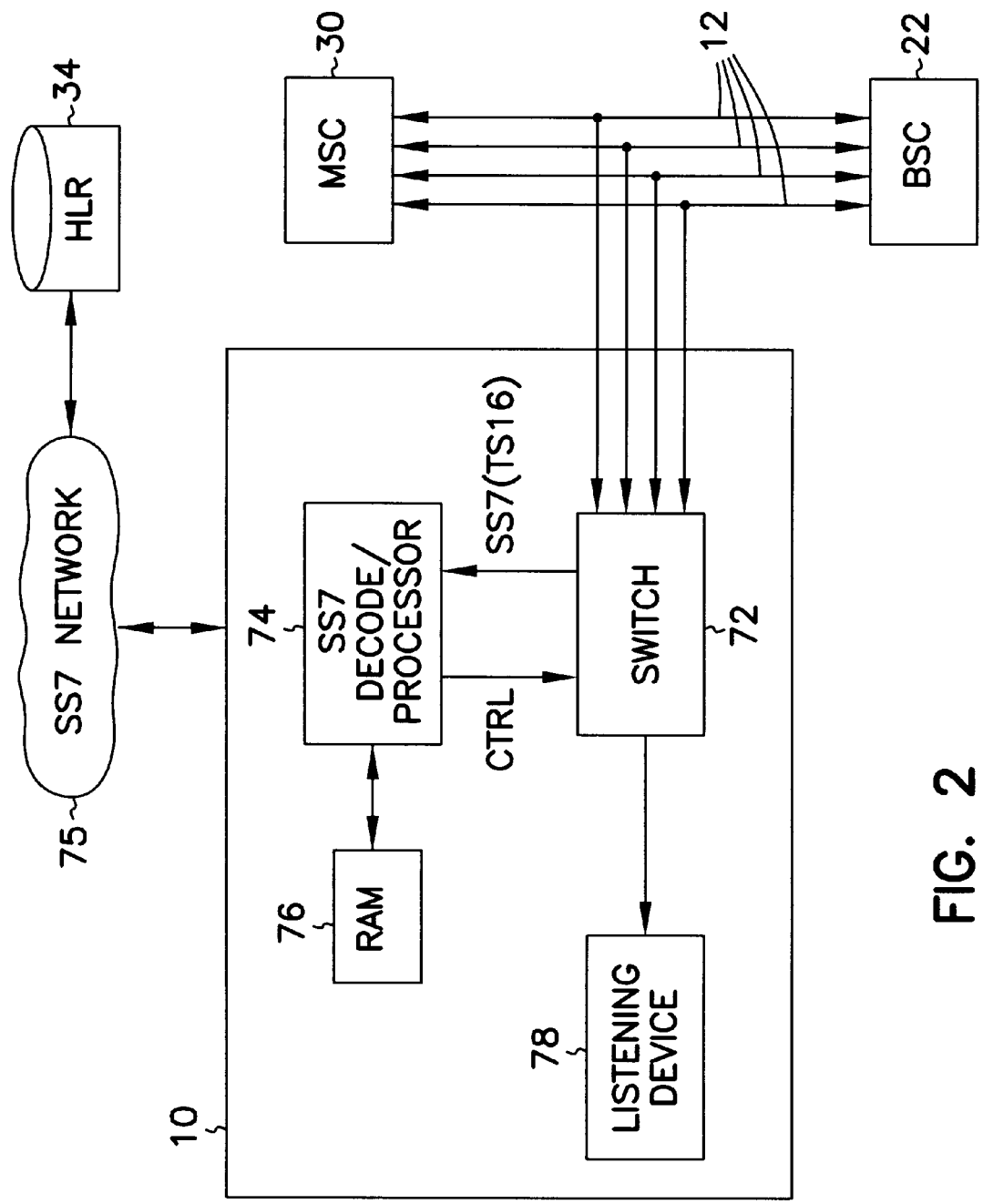
FIG. 2 is a high level block diagram of the monitor of FIG. 1.

Details of the monitoring system 10 are provided in FIG. 2, where it is seen that the monitoring system includes a switch 72 such as a digital cross-connect or host controlled switch (which are available from Summa Four Inc. and Excel Inc.), a SS7 decoder/processor 74 (such as a properly programmed SUN SPARC or a PC), a memory (RAM) or disk 76, and a listening device 78. All information on the A Interface is provided by the bridging Y-cables 12 to the switch 72, and all out-of-band signalling information (e.g. SS7 control information) which is carried in a predetermined time slot of the E1 or T1 frame is forwarded by the switch 72 to the decoder/processor 74. The processor 74 is used to decode the SS7 information. Thus, whenever a new call is set up, the called and calling identifiers are provided in the SS7 message over the A Interface SS7 signal, and the processor 74 is used to find this information. Once the called and calling identifiers of a new call are determined, the processor 74 searches the memory 76 to determine whether the called and/or calling identifiers match the identifier of a "to-be-tapped" number stored in memory. If so, the processor 74 provides control (CTRL) information which causes the switch 72 to forward the copy of the call through the switch 72 to the listening device 78. Because the SS7 information is continuously monitored, at the termination of a call (as indicated by an SS7 message), the processor 74 provides control information which causes the switch 72 to reset so that another call utilizing the now available channel will not be intercepted, unless it is also subject to a lawful intercept.

It will be appreciated by those skilled in the art that an E1 signal is a 2.048 Mbits/second signal which utilizes a frame of two hundred fifty-six bits which are divided into thirty-two timeslots (TS) of 64 Kbits/second. The first timeslot (TS0) is typically used for carrying framing information. Timeslot 16 (TS16) is typically used for carrying out-of-band signaling information such as the SS7 signaling, although other timeslots can carry this information if desired. The remaining timeslots are utilized for carrying data. Thus, typically, only TS16 of the E1 frame will be forwarded to the SS7 decoder/processor 74 for processing, while data in any of the channels of the other timeslots may be forwarded to the listening device 78 if so dictated by the processor 74 and switched by the switch 72. It should also be appreciated that multiple channels can be carried within any timeslot of the E1 frame in a time division multiplexed manner. Thus, if a particular call requires less than a 64K bandwidth, it is possible for the switch 72 to provide only certain bits of a particular timeslot (those bits representing a channel) to the listening device 78. On the other hand, it is also possible for a single channel to utilize more than one timeslot of the E1 frame; in which case, the switch 72 would provide the data for the different timeslots to the listening device 78 in order to monitor a single call. Furthermore, it is possible for the overhead of multiple E1 lines to be provided in TS16 of the frame of one of those E1 lines. In that case, only TS16 of the E1 frame which carried the out-of-band signaling would be forwarded to the SS7 decoder/processor 74.

As aforementioned, in accord with the invention, the SS7 signaling is continuously being monitored by the SS7 processor 74. The continuous monitoring permits a continuous intercept of a call even when one of the parties moves from one cell to another cell. In fact, since a hand-off a of cellular telephone call from one BSC to another BSC is handled under SS7 control, when the hand-off is made, the processor 74 will cause switch 72 to stop sending a first channel and to start sending another channel to the listening device 78.

The listening device 78 of the monitoring system 10 may take any of several forms. Typically, the listening device 78 will include the decoder portion of a codec and a digital recording device. In lieu of the digital recording device, the listening device can utilize a D/A converter, an analog recording device (e.g., a tape recorder). Regardless of how implemented, the listening device 78 can preferably provide a playable record of the intercepted data.

It should be appreciated by those skilled in the art that a programming means (not shown) can be utilized by a user to load the telephone numbers and mobile identifier numbers (MINs, IMSIs) into the RAM 76 or disk of the monitor 10 so that the decoder/processor 74 can properly compare the identifier numbers in the SS7 signal to the stored numbers. Alternatively, and in accord with a preferred aspect of the invention, the monitor 10 of the invention is arranged to be a node of the network (i.e., it is given a node ID), and is configured to appear as an MSC. Thus, and as seen in FIG. 2 and in phantom in FIG. 1, the monitor 10 is provided with the ability (via the SS7 network 75) to provide the HLR 34 with a telephone number and receive back the mobile identification number which may also be used by the monitor for comparison purposes. In particular, the monitor 10 can query the HLR to <send routing info>, and in response the HLR would return <routing info> which would include a mobile identification number and a last location for that mobile subscriber. The mobile ID number and last locations can then be stored in RAM or disk 76. As previously described, the mobile identification number and/or called and calling party telephone numbers are utilized by the decoder/processor 74 for comparison to the incoming SS7 control information in order to determine whether a copy of a call is to be forwarded to the listening device. However, as will be appreciated by those skilled in the art, the last location information can also be useful for law enforcement purposes. The location information regarding the mobile subscriber can be updated as frequently as required by the law enforcement officers.

There have been described and illustrated herein an apparatus and method for lawfully intercepting mobile/cellular telephone calls. While particular embodiments of the invention have been described, it is not intended that the invention be limited thereto, as it is intended that the invention be as broad in scope as the art will allow and that the specification be read likewise. Thus, while the invention has been described with particular reference to the GSM standard, those skilled in the art will appreciate that it is possible to monitor SS7 signals within a mobile telecommunication system utilizing the IS54 standard. Also, while the invention was described primarily with respect to the continuous monitoring of SS7 control signals, it will be appreciated that while not preferred, any other out-of-band signaling such as ISDN, X.25, or a proprietary scheme may be monitored on the A Interface. Furthermore, while the invention was described with reference to E1 lines and E1 Y-cables, the invention applies to any other call carrying interfaces such as T1, where a T1 Y-cable would be used for making copies of the overhead portion of the T1 frame. Further yet, it should be appreciated that while the invention was described with particular reference to certain hardware, other hardware or hardware arrangements could be utilized. Thus, for example, it would be possible to provide the E1 or T1 line carrying the out-of-band control signal directly to the decoder/processor which could effectively demultiplex the signal as required prior to processing the information and controlling the switch. It should be appreciated, however, that in this arrangement, the decoder/processor would be effectively assuming a switch function in addition to its decoding, processing, and control functions. It will therefore be appreciated by those skilled in the art that yet other modifications could be made to the provided invention without deviating from its spirit and scope as so claimed.

We claim:

1. Apparatus for the intercept of mobile telecommunications being processed by a base station system, control of said mobile telecommunications being conducted according to the SS7 standard, said apparatus comprising:

a) non-intrusive bridging means comprising a Y-cable for bridging a telecommunications line of the base station system which transmits data according to a frame, and providing a copy of all data on that telecommunications line, said telecommunications line carrying SS7 signaling information in a predetermined timeslot in the frame;

b) a switch coupled to said bridging means;

c) a memory means for storing a plurality of first indications of telephone numbers which are to be intercepted;

d) a listening means coupled to said switch for providing a listenable and/or playable record of an intercepted call; and e) processor means coupled to said switch and said memory means, said processor means for continuously receiving a copy of said SS7 signaling information, for decoding said SS7 control signaling to provide second indications of telephone numbers of called and calling parties, for comparing said first and second indications, and for controlling said switch so as to provide a copy of selected data to said listening means when a match between said a first indication and a second indication is made.

2. An apparatus according to claim 1, wherein:

the telecommunications lines is one of an E1 and a T1 line, and said Y-cable is one of an E1 and a T1 Y-cable.

3. An apparatus according to claim 2, wherein:

said Y-cable is an E1 Y-cable and provides thirty-two consecutive timeslots to said switch, with said SS7 signaling information being contained in a seventeenth timeslot (TS16) of said thirty-two consecutive timeslots, and said switch provides a copy of said signaling information in TS16 to said processor means.

4. An apparatus according to claim 2, wherein:

said E1 Y-cable couples said switch to an A Interface of the base station system.

5. An apparatus according to claim 1, wherein:

said first indications of telephone numbers are mobile identification numbers or subscriber identification numbers of mobile telephones to be tapped, and said second indications of telephone numbers of called and calling parties are mobile identification numbers or subscriber identification numbers of said called and calling parties.

6. An apparatus according to claim 1, where the base station system is part of a telecommunications network which includes a home location register (HLR) means for storing a database relating mobile telephone numbers and mobile identification numbers, wherein:

said apparatus is arranged to be a node of the telecommunications network and is configured within the telecommunications network to appear as a mobile service switching center (MSC) with means for querying the HLR means with a mobile telephone number and for receiving from the HLR means a mobile identification number.

7. Apparatus for the intercept of mobile telecommunications being processed by a base station system and a switching element subsystem coupled by an A Interface, said apparatus comprising:
   a) non-intrusive A Interface bridging means for bridging a telecommunications line of the A Interface and for providing a copy of all data on that telecommunications line, said telecommunications line carrying out-of-band control information in a predetermined location in a telecommunications frame, wherein the telecomunications line is one of an E1 and a T1 line, and said A Interface bridging means comprises one of an E1 and a T1 Y-cable;
   b) a switch coupled to said bridging means;
   c) a memory means for storing a plurality of first indications of telephone numbers which are to be intercepted;
   d) a listening means coupled to said switch for providing a playable record of an intercepted call; and
   e) processor means coupled to said switch and said memory means, said processor means for continuously receiving a copy of said out-of-band signaling information, for decoding said out-of-band signaling information to provide second indications of telephone numbers of called and calling parties, for comparing said first and second indications, and for controlling said switch so as to provide a copy of selected data to said listening means when a match between said a first indication and a second indication is made.

8. An apparatus according to claim 7, wherein:
said out-of-band signaling information is SS7 signaling information.

9. An apparatus according to claim 8, wherein:
said telecommunications line is an E1 line, and said A Interface bridging means is an E1 Y-cable which provides thirty-two consecutive timeslots to said switch, with said SS7 signaling information being contained in a seventeenth timeslot (TS16) of said thirty-two consecutive timeslots, and said switch provides a copy of said signaling information in TS16 to said processor means.

10. An apparatus according to claim 7, wherein:
said first indications of telephone numbers are mobile identification numbers or subscriber identification numbers of mobile telephones to be tapped, and
said second indications of telephone numbers of called and calling parties are mobile identification numbers or subscriber identification numbers of said called and calling parties.

11. An apparatus according to claim 7, where the base station system and switching element subsystem are part of a telecommunications network which includes a home location register (HLR) means for storing a database relating mobile telephone numbers and mobile identification numbers, wherein:
said apparatus is arranged to be a node of the telecommunications network and is configured within the telecommunications network to appear as a mobile service switching center (MSC) with means for querying the HLR means with a mobile telephone number and for receiving from the HLR means a mobile identification number.

12. Apparatus for the intercept of mobile telecommunications being processed by a base station system, control of said mobile telecommunications being conducted according to the SS7 standard, said apparatus comprising:
   a) non-intrusive bridging means for bridging a telecommunications line of the base station system which transmits data according to a frame, and providing a copy of all data on that telecommunications line, said telecommunications line carrying SS7 signaling information in a predetermined timeslot in the frame;
   b) a switch coupled to said bridging means;
   c) a memory means for storing a plurality of first indications of telephone numbers which are to be intercepted;
   d) a listening means coupled to said switch for providing a listenable and/or playable record of an intercepted call; and
   e) processor means coupled to said switch and said memory means, said processor means for continuously receiving a copy of said SS7 signaling information, for decoding said SS7 control signaling to provide second indications of telephone numbers of called and calling parties, for comparing said first and second indications, and for controlling said switch so as to provide a copy of selected data to said listening means when a match between said a first indication and a second indication is made; and
   f) further wherein the base station system is part of a telecommunications network which includes a home location register (HLR) means for storing a database relating mobile telephone numbers and mobile identification numbers, wherein said apparatus is arranged to be a node of the telecommunications network and is configured within the telecommunications network to appear as a mobile service switching center (MSC) with means for querying the HLR means with a mobile telephone number and for receiving from the HLR means a mobile identification number.

13. Apparatus for the intercept of mobile telecommunications being processed by a base station system and a switching element subsystem coupled by an A Interface, said apparatus comprising:
   a) non-intrusive A Interface bridging means for bridging a telecommunications line of the A Interface and for providing a copy of all data on that telecommunications line, said telecommunications line carrying out-of-band control information in a predetermined location in a telecommunications frame;
   b) a switch coupled to said bridging means;
   c) a memory means for storing a plurality of first indications of telephone numbers which are to be intercepted;
   d) a listening means coupled to said switch for providing a playable record of an intercepted call;
   e) processor means coupled to said switch and said memory means, said processor means for continuously receiving a copy of said out-of-band signaling information, for decoding said out-of-band signaling information to provide second indications of telephone numbers of called and calling parties, for comparing said first and second indications, and for controlling said switch so as to provide a copy of selected data to said listening means when a match between said a first indication and a second indication is made; and
   f) wherein the base station system and switching element subsystem are part of a telecommunications network which includes a home location register (HLR) means for storing a database relating mobile telephone numbers and mobile identification numbers, wherein said apparatus is arranged to be a node of the telecommunications network and is configured within the telecommunications network to appear as a mobile service switching center (MSC) with means for querying the HLR means with a mobile telephone number and for receiving from the HLR means a mobile identification number.

* * * * *